US012812424B2

(12) United States Patent
Kwok et al.

(10) Patent No.: US 12,812,424 B2
(45) Date of Patent: Nov. 24, 2026

(54) NETWORK PERFORMANCE EVALUATION BASED ON CONCURRENT MACHINE LEARNING MODELS AND SYSTEMS AND METHODS OF THE SAME

(71) Applicant: T-Mobile USA, Inc., Bellevue, WA (US)

(72) Inventors: Ming Shan Kwok, Seattle, WA (US); Wafik Abdel Shahid, Kenmore, WA (US); Antoine T. Tran, Sammamish, WA (US); Emile Minh Tran, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 315 days.

(21) Appl. No.: 18/602,221

(22) Filed: Mar. 12, 2024

(65) Prior Publication Data

US 2025/0294383 A1 Sep. 18, 2025

(51) Int. Cl.
*H04W 24/08* (2009.01)
*H04L 41/16* (2022.01)

(52) U.S. Cl.
CPC ............. *H04W 24/08* (2013.01); *H04L 41/16* (2013.01)

(58) Field of Classification Search
CPC ..... H04W 24/08; H04W 24/02; H04W 24/10; H04L 41/16
See application file for complete search history.

(56) References Cited

U.S. PATENT DOCUMENTS

| | | | |
|---|---|---|---|
| 6,879,832 B1 | 4/2005 | Palm et al. | |
| 8,165,587 B2 | 4/2012 | Dahlen et al. | |
| 8,477,811 B2 | 7/2013 | Kitazoe | |
| 9,615,272 B2 | 4/2017 | Morad et al. | |
| 9,642,068 B2 | 5/2017 | Chen et al. | |
| 9,648,591 B2 | 5/2017 | Rastogi | |
| 9,907,006 B2 | 2/2018 | Walley et al. | |
| 12,526,653 B2 * | 1/2026 | Esswie | H04W 24/02 |
| 2004/0203736 A1 | 10/2004 | Serna | |
| 2024/0073717 A1 * | 2/2024 | Balakrishna | H04W 24/02 |

FOREIGN PATENT DOCUMENTS

| | | |
|---|---|---|
| EP | 3335466 B1 | 1/2020 |
| EP | 3766275 B1 | 1/2022 |
| KR | 100734644 B1 | 7/2007 |
| WO | 2017084723 A1 | 5/2017 |
| WO | 2018125686 A2 | 7/2018 |

OTHER PUBLICATIONS

Namgoong et al., WO 2023070348 A1, May 4, 2023, Wireless communication method for configuring User Equipment's with Machine learning models, all (Year: 2023).*

* cited by examiner

*Primary Examiner* — Curtis A Kuntz

(74) *Attorney, Agent, or Firm* — Ashurst Perkins Coie US LLP

(57) ABSTRACT

Systems and methods for evaluating network performance based on concurrent machine learning models are disclosed herein. The system can receive a device profile and a core profile. The system can generate confidence metric values based on the device profile and the core profile. The system can transmit the device report to an associated mobile device and the core report to an associated core network node. The system can cause the mobile device to terminate or initiate a connection according to the device profile and the core profile.

20 Claims, 6 Drawing Sheets

NETWORK PERFORMANCE EVALUATION BASED ON CONCURRENT MACHINE LEARNING MODELS AND SYSTEMS AND METHODS OF THE SAME

BACKGROUND

A cell site, cell phone tower, cell base tower, or cellular base station is a cellular-enabled mobile device site where antennas and electronic communications equipment are placed (typically on a radio mast, tower, or other raised structure) to create a cell, or adjacent cells, in a cellular network. The raised structure typically supports an antenna and one or more sets of transmitter/receivers transceivers, digital signal processors, control electronics, a global positioning system (GPS) receiver for timing (for code-division multiple access (CDMA) or global system for mobile communications (GSM) systems), primary and backup electrical power sources, and sheltering. A communications satellite is an artificial satellite that relays and amplifies radio telecommunication signals via a transponder; it creates a communication channel between a source transmitter and a receiver at different locations on Earth. Communications satellites are used for television, telephone, radio, internet, and military applications. Electronic devices, such as mobile phones or autonomous vehicles, can connect to base stations or communications satellites to transmit or receive data from other devices connected to the cellular network.

A cellphone may not work at times because it is too far from a base station, is unable to communicate with a communications satellite, or because the phone is in a location where cell phone signals are attenuated by thick building walls, hills, or other structures. The signals do not need a clear line of sight but greater radio interference will degrade or eliminate reception. When many people try to use the base station or communications satellite at the same time, e.g. during a traffic jam or a sports event, then there will be a signal on the phone display but it is blocked from starting a new connection. The other limiting factor for cell phones is the ability to send a signal from its low powered battery to the cell site. Some cellphones perform better than others under low power or low battery, typically due to the ability to send a good signal from the phone to the base station or communications satellite.

BRIEF DESCRIPTION OF THE DRAWINGS

Detailed descriptions of implementations of the present invention will be described and explained through the use of the accompanying drawings.

Figure 1:
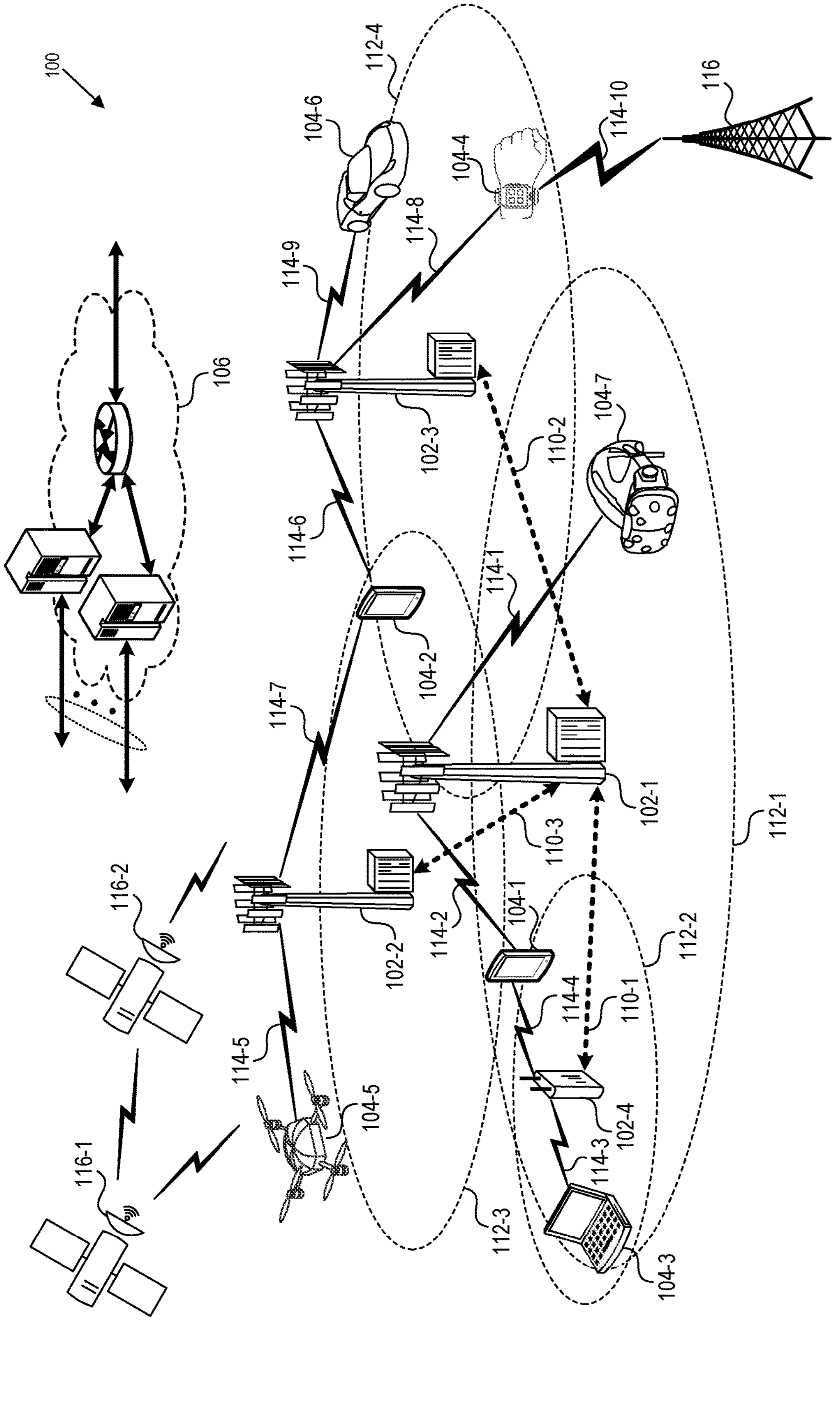
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Existing telecommunications systems include complex interactions and decisions associated with multiple network-related devices and nodes. Fifth-generation (5G) telecommunication networks include RANs (e.g., associated gNodeB nodes) that can be limited in their capacity to provide connectivity to mobile devices. Usage and/or capacity of a given RAN can affect the wider telecommunication network by influencing mobile device registrations across the network. As such, a telecommunication network can exhibit bottlenecks or service outages if associated resources are used inefficiently.

Mobile devices can connect to telecommunication networks through such RANs. A mobile device may attempt to optimize the associated user experience by initiating a connection with a telecommunication network (e.g., an associated RAN) with satisfactory performance characteristics, such as signal strength, bandwidth, or frequency. However, in pre-existing systems, mobile devices are generally agnostic to the status or capacity of the telecommunication network. For example, a mobile device may attempt to connect to a RAN associated with the 5G telecommunication network that is experiencing capacity issues. As such, without further information, the mobile device cannot make an accurate decision to connect to a RAN in a manner that minimizes the connection's effect on network performance across the telecommunication network as a whole. Further, mobile devices and components of the telecommunication network may have conflicting goals or information, leading to inefficient use of the network and deterioration of network service quality.

To illustrate, in some cases, a mobile device associated with a user may be moving quickly through a geographic region (e.g., if the user is riding a train). The user's device may attempt to register with (e.g., initiate a connection) with the closest RAN associated with the 5G telecommunication network. However, as the user is travelling quickly through the region, the mobile device may be required to de-register and re-register with different RANs repeatedly if the range associated with the RANs are small, thereby affecting the user experience or performance of the mobile device. In addition, the telecommunication network may include particular RANs with capacity restrictions, bandwidth restrictions, or other performance issues. Absent any relevant information regarding these issues or restrictions, the mobile device may determine to connect to such an undesirable RAN, thereby contributing to network congestion. As such, pre-existing telecommunication networks can suffer from poor performance in dynamic situations.

Providing network-related performance information to the mobile device can enable the mobile device to make improved decisions with respect to network connections. However, the mobile device may require different information to make such determinations than is readily available from the network (e.g., the RAN or the core network). For example, a mobile device moving quickly through a geographical region in a particular direction may benefit from information relating to RANs in a geographical region at which the mobile device may be in the future (e.g., along an associated train route). Furthermore, the RAN to which the mobile device is connected may have limited information, such as relating to base stations in other geographic regions. While a node associated with the core network may access network-wide information, the core network does not access information relevant to a particular mobile device's connectivity decisions (e.g., relating to the user's train journey). As such, the mobile device, in pre-existing telecommunication networks, cannot obtain suitable information from the RAN or the core network to initiate a network connection in a manner that significantly improves overall network performance, as well as situational network performance (e.g., with respect to the user's train journey).

The network evaluation system disclosed herein enables network-associated devices to initiate connections in a manner that improves both device-specific and network-wide performance. A RAN system of a telecommunication network associated with the network evaluation system can receive device-related information generated from a machine learning model associated with a mobile device attempting to connect to the network. Similarly, the RAN system can receive core network-related information generated from another machine learning model associated with the core network. Based on this information, as well as local, RAN-related information, a machine learning model associated with the RAN system may generate reports to proactively send to the device and/or to the core network to provide information relevant to network connection decisions, such as performance-related information. By doing so, the RAN system enables the mobile device and/or the core network to initiate connections with appropriate configurations and/or nodes in order to improve the efficiency, reliability, and capacity of the telecommunication network.

Similarly, a network node system of the telecommunication network associated with the network evaluation system can receive device-related information generated from a machine learning model, where the machine learning model is associated with a mobile device attempting to connect to the network. Similarly, the network node system can receive RAN system-related information generated from another machine learning model associated with the RAN system. Based on this information, as well as network node-related information (e.g., associated with the telecommunication network's core network), the network evaluation system can provide information to inform network connection decisions, including information relating to network performance, network capacity, or other quality-of-service information. As such, the network node system enables the mobile device and/or the RAN system to initiate connections in a manner that improves the network-wide reliability of the system by enabling the mobile device to terminate and/or initiate connections in a network-aware manner.

The technical benefits conferred by the network evaluation system enable devices, nodes, and/or systems associated with the telecommunication network to leverage relevant data for decisions. For example, the mobile phone can receive a report including relevant network performance-related data to inform a decision to connect to a given RAN site, based on contextual information relating to the sites. A mobile device travelling on a train, for example, can provide information to a RAN site (e.g., base station or NAN) associated with a potential future location (e.g., based on a train schedule)—based on this information, the RAN system can query a network node (e.g., associated with the core network) regarding other base stations that are more compatible with the mobile phone's future location and/or have more satisfactory network capacity. By leveraging machine learning models to generate communications between the components connected to the network, the network evaluation system enables generation of messages relating to aspects of the associated components that are relevant to network connection decisions, while avoiding the transmission of extraneous, irrelevant information. As such, the network evaluation system enables efficient curation and transmission of information to other network components in a collaborative manner, enabling the network to improve performance in a holistic, network-wide manner.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs (e.g., network node systems) of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.). In some implementations, base stations are associated with one or more RANs, enabling a connection between a user equipment (e.g., an electronic device) and the core network.

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QoS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
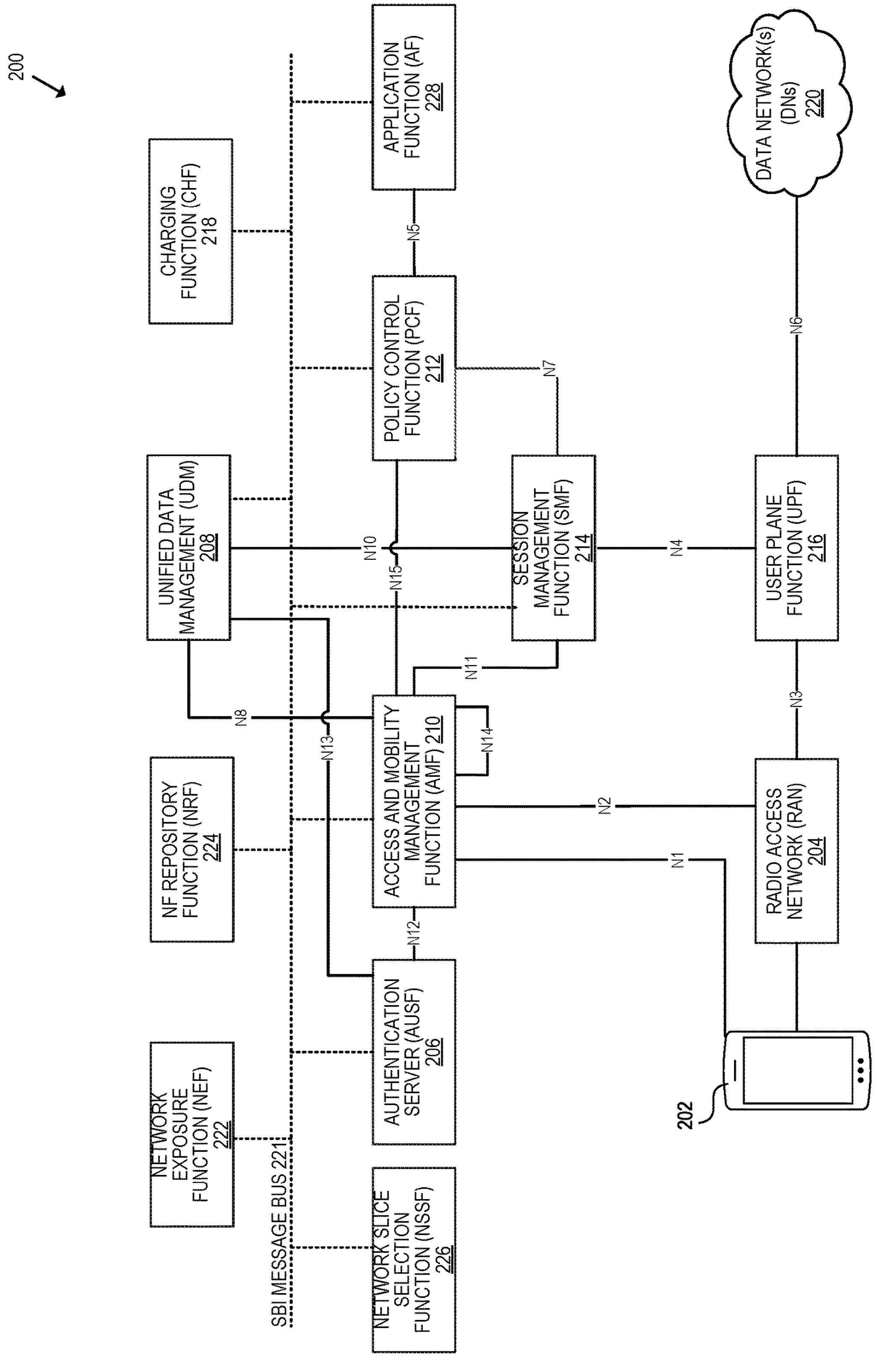
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Network Evaluation System

Figure 3:
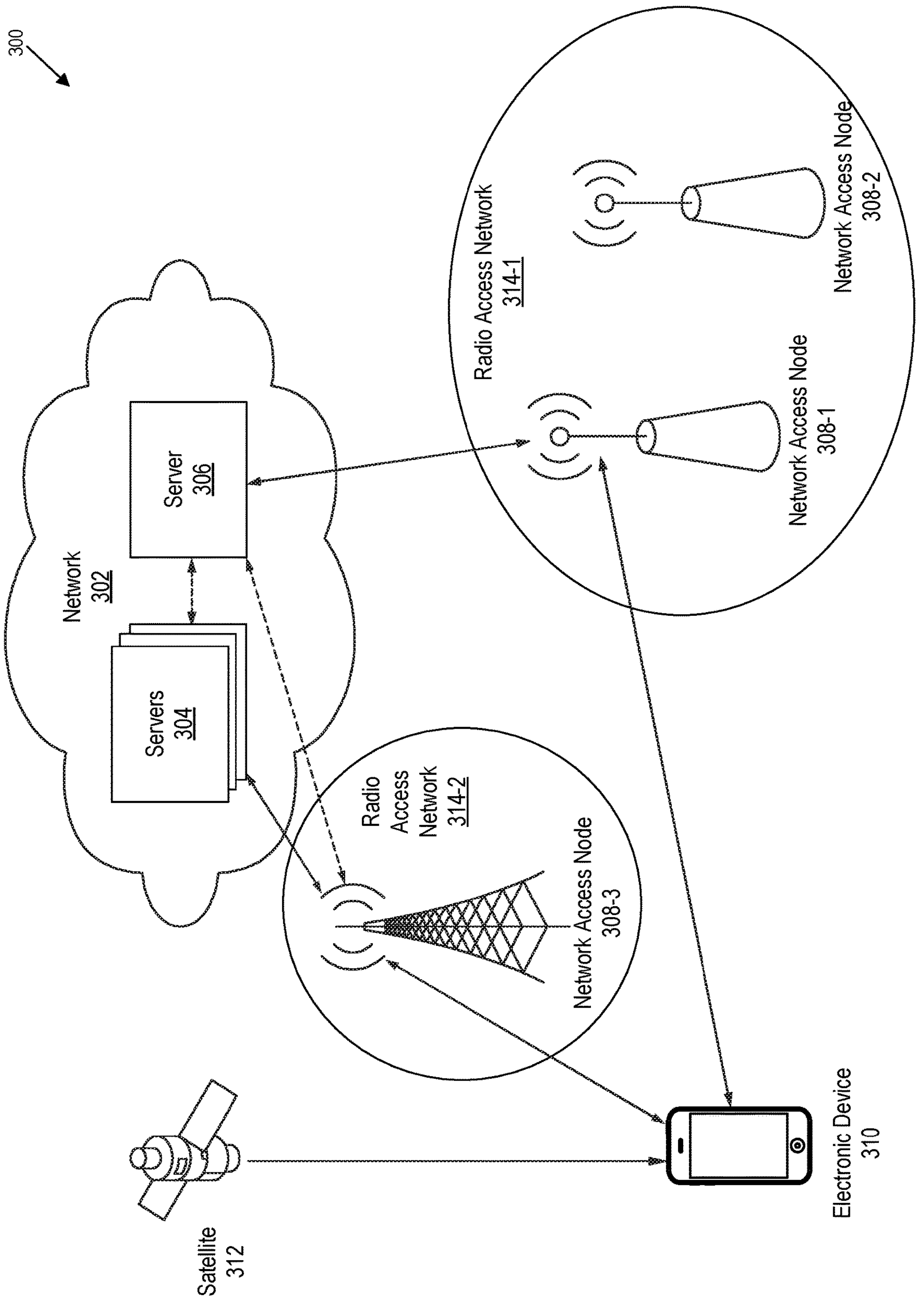
FIG. 3 is a block diagram that illustrates a network evaluation system associated with a wireless communications system, in accordance with aspects of the present technology.

FIG. 3 is a block diagram that illustrates a network evaluation system environment 300 associated with a wireless communications system, in accordance with aspects of the present technology. For example, FIG. 3 includes components of network 302, including one or more servers 304 or 306. For example, the network 302 can interface with backhaul systems or network access nodes 308-1 or 308-2. Network access nodes 308 enable communication of mobile devices or user equipment, such as an electronic device 310 with other devices associated with the network 302 and/or the network access nodes 308-1 or 308-2. In some implementations, mobile devices of the network can interface with non-terrestrial systems, such as a satellite 318. As such, the network 302 enables flexible communication between user equipment at different locations, via different network access nodes.

For example, the network 302 can include a 5G network, as described above. The network 302 can include servers 304 or 306, which can include one or more systems associated with the telecommunication network. For example, the server 306 can include hardware or software components associated with the functioning of the network access node 308-2, including storage, processors, or other components. The server 306 can include media capable of receiving network performance measurements to user equipment and/or RAN systems associated with the network (through corresponding network access nodes and/or through corresponding backhauls). In some implementations, the server 306 can initiate and/or terminate network connections associated with an associated base station or network access node. For example, the network access node 308-1 can terminate or instantiate a network connection with the electronic device 312-1 based on information relating to the electronic device and/or associated applications. Alternatively, an electronic device (e.g., the electronic device 312-1) can determine to terminate or instantiate a network connection with the network access node 310-1.

For example, the environment 300 can include user equipment systems. A user equipment system can include hardware or software components associated with user equipment (e.g., an electronic device, such as a mobile device, a vehicle, or an unmanned aerial vehicle). A user equipment system can include physical components, such as processors, storage media, user displays, and/or other components. In some implementations, the user equipment system can include or execute applications, which can include network capability requirements. In some implementations, a user equipment system can communicate with satellites, such as through a GPS interface. For example, the user equipment system can determine whether a given base station (e.g., the network access node 308-1) has sufficient performance (e.g., an uplink speed, downlink speed, or latency) for a given application.

User equipment systems can communicate with the network 302 through one or more RAN systems and/or associated network access nodes. A RAN system can include a portion of a telecommunication network associated with radio access technology. A RAN system resides between a user equipment system and a core network, and can be associated with one or more base station systems. For example, as shown in FIG. 3, the RAN 314-1 includes NAN 308-1 and 308-2, while the RAN 314-2 includes NAN 308-3. A RAN system can include one or more antennas, radios, and baseband units. A RAN system can provide access to and manage resources associated with NANs. As such, a RAN system enables communication between a user equipment and the core network.

A RAN system can be associated with a RAN database. A RAN database can include a store of information relating to nodes, components, or data associated with a given RAN system. For example, a RAN database includes an indication of a set of base stations (e.g., NANs associated with a given RAN). In some embodiments, the RAN database can include information relating to other RAN systems, such as information relating to network cells that are of a different level (e.g., an upper-level cell, corresponding to a cell with a greater geographic reach than a lower-level cell). As such, the RAN database and associated information enables network components to make improved decisions for connections with associated base stations.

Figure 4:
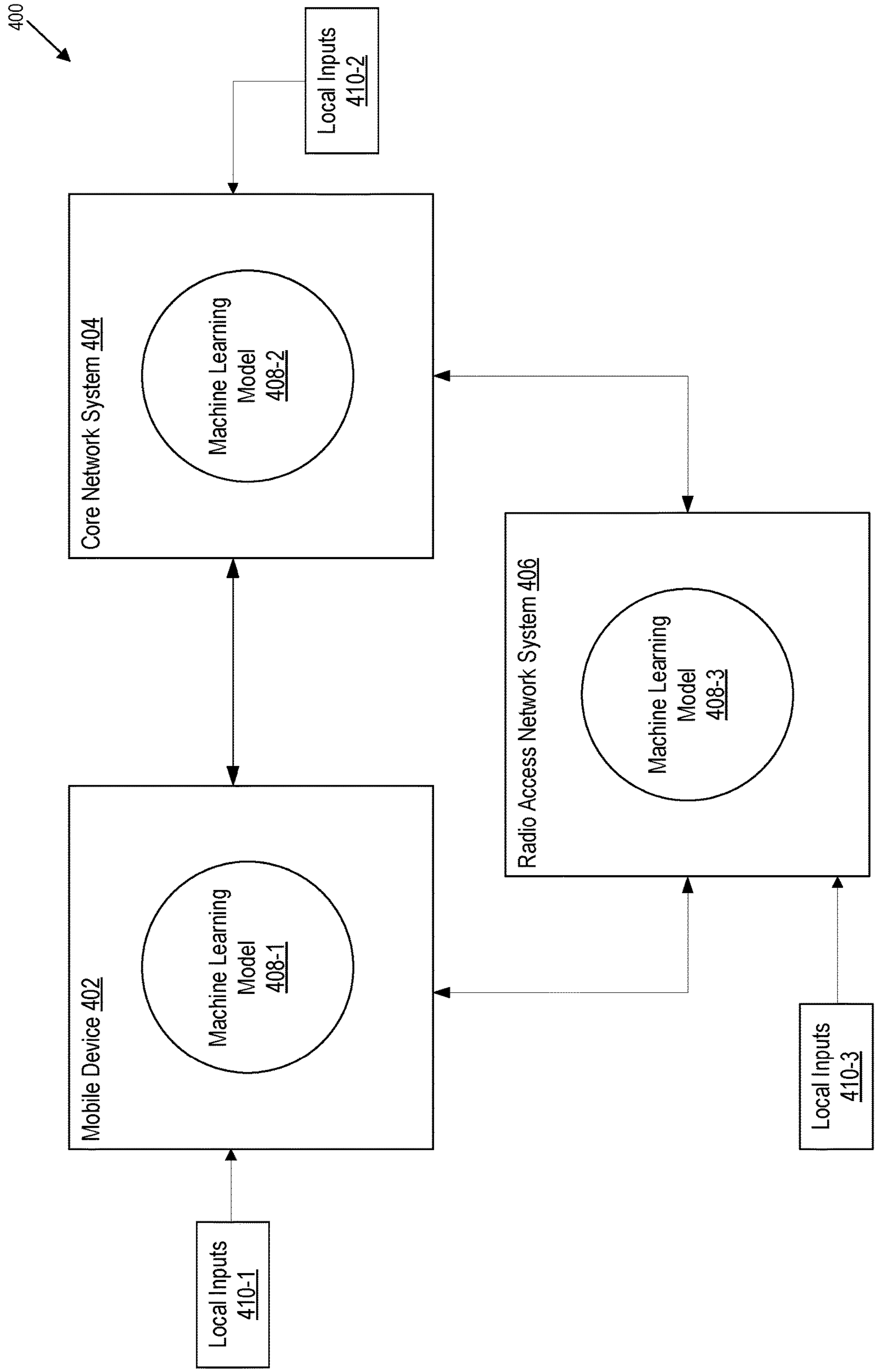
FIG. 4 is a block diagram that illustrates machine learning models associated with a mobile device, a network node, and a radio access network node, as well as associated communication paths.

FIG. 4 is a block diagram 400 that illustrates machine learning models associated with a mobile device 402, a core network system 404, and a RAN system 406, as well as associated communication paths. For example, the mobile device 402 can include with the machine learning model 408-1. The core network system 404 can include the machine learning model 408-2. The RAN system 406 can include the machine learning model 408-3. These machine learning models can communicate with each other (e.g., via network or application programming interfaces) through communication paths, enabling transmission of outputs and inputs between the different components of the network. By doing so, the network evaluation system enables the sharing of relevant information for network connection decisions.

A machine learning model can include an algorithm, process, or module capable of generating outputs from inputs. For example, the machine learning model 408-1, associated with the mobile device 402, can generate reports based on input data, where the input data can include local inputs 410-1 and/or inputs from other components of the telecommunication network (e.g., inputs from the RAN system 406 and/or the core network system 404). In some implementations, the machine learning model includes a large language model (e.g., a generative artificial intelligence) that is capable of summarizing, re-stating, or analyzing inputs and generating associated outputs in the form of language or text.

The machine learning model 408-1 can receive local inputs 410-1 (e.g., a device profile) associated with the mobile device 402, including the mobile device's location, an associated user subscription identifier (e.g., a telephone number associated with the mobile device), a schedule or plan associated with the mobile device 402, or other information associated with the device. In some embodiments, the local inputs 410-1 include raw data as produced by software or hardware associated with the mobile device 402. The machine learning model can process the local inputs 410-1 to generate a summarized version of such inputs. In some implementations, the machine learning model 408-1 can receive information from the core network system 404 and the radio access network system 406, such as information generated from machine learning models 408-2 and/or 408-3 (e.g., associated device reports). Based on such inputs, the machine learning model 408-1 can generate reports for transmission to the core network system 404 and/or the RAN system 406 (e.g., a core report and/or a RAN report respectively).

The machine learning model 408-2 can receive local inputs 410-2 (e.g., a core profile) associated with the core network system 404, including user subscription data, network capacity data, network configuration data, spectral efficiency data, or other suitable information associated with the core network system. In some embodiments, the local inputs 410-2 include raw data as produced by software or hardware associated with the core network system 404. The machine learning model can process the local inputs 410-2 to generate a summarized version of such inputs. In some implementations, the machine learning model 408-2 can receive information from the mobile device 402 and the RAN system 406, such as information generated from the machine learning models 408-1 and 408-3 (e.g., associated core reports). Based on such inputs, the machine learning model 408-2 can generate reports for transmission to the mobile device 402 and/or the RAN system 406 (e.g., a device report and/or a RAN report respectively).

The machine learning model 408-2 can receive local inputs 410-3 (e.g., a RAN profile) associated with the RAN system 406, including base station location information, base station capacity information, user subscription information, antenna configuration information, and/or other suitable information associated with the RAN system 406. In some embodiments, the local inputs 410-3 include raw data as produced by software or hardware associated with the RAN system 406. The machine learning model can process the local inputs 410-3 to generate a summarized version of such inputs. In some implementations, the machine learning model 408-3 can receive information from the mobile device 402 and/or the core network system 404, such as information generated from the machine learning models 408-1 and/or 408-2 (e.g., associated RAN reports). Based on such inputs, the machine learning model 408-2 can generate reports for transmission to the mobile device 402 and/or the core network system 404 (e.g., a device report and/or a core report respectively).

The network evaluation system can retrieve, generate, or compile a device profile. A device profile can include information associated with a mobile device or another user equipment system associated with the telecommunication network. For example, the device profile includes local inputs 410-1, including a device identifier associated with the mobile device, including a Media Access Control (MAC) address, an internet protocol (IP) address, a subscription identifier (e.g., a telephone number), and/or other identifying information associated with the mobile device. The device profile information can include location information associated with the user equipment system, including global positioning system (GPS) or network-derived location data.

Additionally or alternatively, the device profile includes an output from the machine learning model 408-1, such as an associated report generated for the core network system (e.g., a core report) and/or an associated report generated for the RAN system (e.g., a RAN report). For example, the machine learning model 408-1 generates a report regarding a prediction of the next location likely associated with a mobile device for transmission to the RAN system 406 and/or the core network system 404. By generating such reports, the network evaluation system enables sharing relevant data between network components, improving the efficiency with which connection initiation or termination decisions may be made. For example, the generated device profile includes information relating to the mobile device in a summarized, size-efficient format, thereby reducing the bandwidth required to transmit the profile to other relevant network components.

The device profile can include location data. The location data can include information relating to a mobile device or user's location. For example, the location data includes geographical coordinates (e.g., latitudes and longitudes) associated with the mobile device over time, including associated timestamps. As an illustrative example, the location data includes a set of points representing a user's location, as indicated by the mobile device, over time. In some implementations, the location data includes information derived from sensors or other components of the user equipment system, including GPS data, network data (e.g., IP address data), or other such information. By recording information relating to the location of a given mobile device and generating reports accordingly, the network evaluation system enables network components to consider the mobile device's location in network connection decisions and/or to determine which information to share with the mobile device. For example, the network evaluation system can generate lists of suitable base stations that may be suitable for a mobile device based on this location data.

In some implementations, a machine learning model (e.g., one of machine learning models 408-1, 408-2 and/or 408-3) can determine a predicted location for the mobile device based on the location data associated with the user equipment system. For example, a predicted location includes a prediction of a set of geographical coordinates associated with a user equipment system's geographical path. In some implementations, the network evaluation system can extrapolate the location data to determine a likely future path associated with the mobile device. The network evaluation system (e.g., associated machine learning models and/or network components) can query third-party databases to receive associated transportation information. For example, the network evaluation system can determine, based on the location data, that the associated mobile device is likely associated with a train route. As such, the network evaluation system, through the RAN system 406, for example, can query a third-party database for train times associated with the determined train route to predict the user equipment system's future path. By doing so, the network evaluation system can derive information relevant to improving the efficiency of network connections (e.g., by enabling the network evaluation system to suggest compatible base stations).

In some implementations, the network evaluation system can retrieve, generate, or compile a RAN profile. For example, a machine learning model (e.g., one of the machine learning models 408-1, 408-2, or 408-3) can receive a RAN profile. The RAN profile can include information relating to the RAN system 406, such as information relating to associated base stations, cells, configurations, bandwidths, or other suitable information. For example, the RAN profile includes information relating to network conditions of associated base stations, including capacity, bandwidth, or other relevant information (e.g., network configurations). For example, the RAN profile can include information generated or retrieved locally from hardware or software devices associated with the RAN. Additionally or alternatively, the RAN profile can include information relating to the RAN as provided to the core network and/or the mobile device in the form of a core report or a device report respectively (e.g., as generated by the machine learning model 408-3). The RAN profile can include summarized, analyzed, or otherwise modified information associated with the RAN—for example, the RAN profile can include a list of base stations associated with the RAN that are likely associated with a mobile device's predicted location. By receiving RAN profiles (e.g., at the mobile device and/or the core network system), the network evaluation system enables information sharing of data relevant to network connection decisions, including initiations or terminations or network connections.

The RAN profile can include telecommunications channel condition data, associated with network conditions associated with one or more telecommunications channels. For example, the RAN profile includes uplink or downlink speeds (e.g., expressed as a data rate), capacity information (e.g., available bandwidth), a number of user equipment systems subscribed to a given base station, RAN, or cell, or other such information. For example, the RAN profile includes spectral efficiency information relating to information rate transmitted over a given bandwidth between a given base station or RAN and an associated device. By providing such data to other components of the network, the network evaluation system enables network components to consider relevant information prior to initiating or terminating connections, thereby improving the efficiency of the network. For example, the RAN profile can include information relating to a congested base station. The network evaluation system can input this RAN profile into an associated machine learning model (e.g., the machine learning model 408-3) to generate reports to be sent to the core network system or the mobile device (e.g., in the form of the core report or a device report, respectively). By doing so, the mobile device and/or the core network system can determine, through respective machine learning models or hardware/software components, to modify information considered when making network connection decisions.

The network evaluation system can retrieve, generate, or compile a core profile. For example, a machine learning model (e.g., one of the machine learning models 408-1, 408-2, or 408-3) can receive a core profile. A core profile includes information relating to the core network, such as user subscription data, network configuration data, RAN metadata (e.g., including data associated with different cells or associated RAN systems). In some implementations, the core profile can include information from third-party sources derived through the core network (e.g., through an associated network exposure function). For example, the core profile includes information relating to network features or Qualities-of-Service (QoSs) associated with a given device identifier or associated user subscription. By considering such information, the network evaluation system enables improved decision-making relating to network connections between the RAN system and associated mobile devices by ensuring compatibility between the various network components.

In some implementations, a core profile can include a user subscription indicator. A user subscription indicator can include information relating to a user subscription, including a QoS or associated network features or bands available to the user. For example, the user subscription indicator includes information relating to the user's registered location (e.g., address), demographic information, or other information relating to the user. The user subscription indicator can be associated with the device identifier or another user identifier (e.g., a name or username associated with the user). By retrieving a user subscription indicator based on the device information, the network evaluation system can generate the core profile for provision to other network components (e.g., the RAN system and/or the mobile device system) in order to enable connection decisions that are component with any rules or criteria associated with a given user subscription status.

In response to inputting relevant information into machine learning models (e.g., one of machine learning models 408-1, 408-2, and/or 408-3), the network evaluation system can generate reports for transmission to other network components. For example, the mobile device 402, through the machine learning model 408-1, can generate a core report for transmission to the core network system 404 and a RAN report for transmission to the RAN system 406. Similarly, the core network system 404, through the machine learning model 408-2, can generate a device report for transmission to the mobile device 402 and a RAN report for transmission to the RAN system 406. The RAN system 406, through the machine learning model 408-3, can generate a device report for transmission to the mobile device 402 and a core report for transmission to the core network system 404. By compiling relevant information for transmission to other network components, the network evaluation system enables sharing of relevant information for improved network connection decisions.

For example, a core report can include information shared with a core network node relating to the mobile device 402 and/or the RAN system 406. Such information may include mobile device location or identifier information, and/or network capacity information associated with the RAN. The core report, as generated at the mobile device 402 and/or at the RAN system 406, can be modified or changed depending on the nature of the mobile device 402 and/or the RAN system 406. For example, the core report can include location information and/or predicted location information associated with the mobile device 402 when a calculated speed of the mobile device is greater than a threshold speed. In other situations (e.g., where the mobile device appears stationary according to associated location data), the associated machine learning model 408-1 may generate the core report not to include a predicted location, thereby improving the efficiency of the transmission of the core report by omitting information that is likely to be irrelevant.

The device report can include information shared with the mobile device relating to the core network system 404 and/or the RAN system 406, as generated by associated machine learning models. For example, the device report can include information relating to any base stations that are affected by congestion or other service issues. Similarly, the device report can include information relating to cells or networks that is associated with the mobile device's predicted location (e.g., the next location associated with a user's train journey). By receiving such information in the form of a device report, the mobile device 402 can receive information that can inform network connection decisions, such as decisions to initiate or terminate connections with base stations associated with the RAN system 406.

The RAN report can include information shared with the RAN system 406 relating to the core network system 404 and/or the mobile device 402, as generated by associated machine learning models. For example, the RAN report can include information relating to user subscriptions associated with the mobile device and/or location information associated with the mobile device (e.g., location data or predicted location data). For example, by receiving such information at the RAN system 406, the network evaluation system enables the RAN system to share, generate, or transmit further relevant information in light of mobile device or network conditions associated with the mobile device or the core network. For example, based on information within the RAN report relating to the mobile device's likely predicted location and/or the associated user subscription data from the core net6work, the RAN system 406 can generate a list of associated base stations that are compatible with the mobile device and the associated user subscription data.

In some implementations, the network evaluation system can determine confidence metric values associated with inputs to the machine learning models. For example, the network evaluation system can determine values indicative of a confidence in the accuracy, precision, or relevance of information received at a network component from another network component. To illustrate, the network evaluation system can determine a confidence in the accuracy of location data based on measuring a noisiness or consistency of received location data from the mobile device.

In situations where the location data appears to vary widely (e.g., jumps multiple kilometers within a second), the network evaluation system can determine that the location data is likely inaccurate or misleading and, in response, the network evaluation system can determine a relatively low confidence metric value. Additionally or alternatively, in situations where the location data appears to be consistent across various measurement devices (e.g., where GPS data and network-derived location data are consistent with each other), the network evaluation system can determine an associated confidence metric value that is relatively greater. For example, the network evaluation system can determine a weight for the inputs to a machine learning model, where the weight is proportional to the confidence metric value. The machine learning model can consider information associated with larger weights more heavily than information associated with smaller weights. By determining a confidence metric value for different inputs to the machine learning models of the components of the telecommunication network and weighing such information differently, the network evaluation system enables consideration of information based on its potential accuracy or relevance to network connectivity, thereby improving the ability of the network evaluation system to enable efficient network connection decisions.

Figure 5:
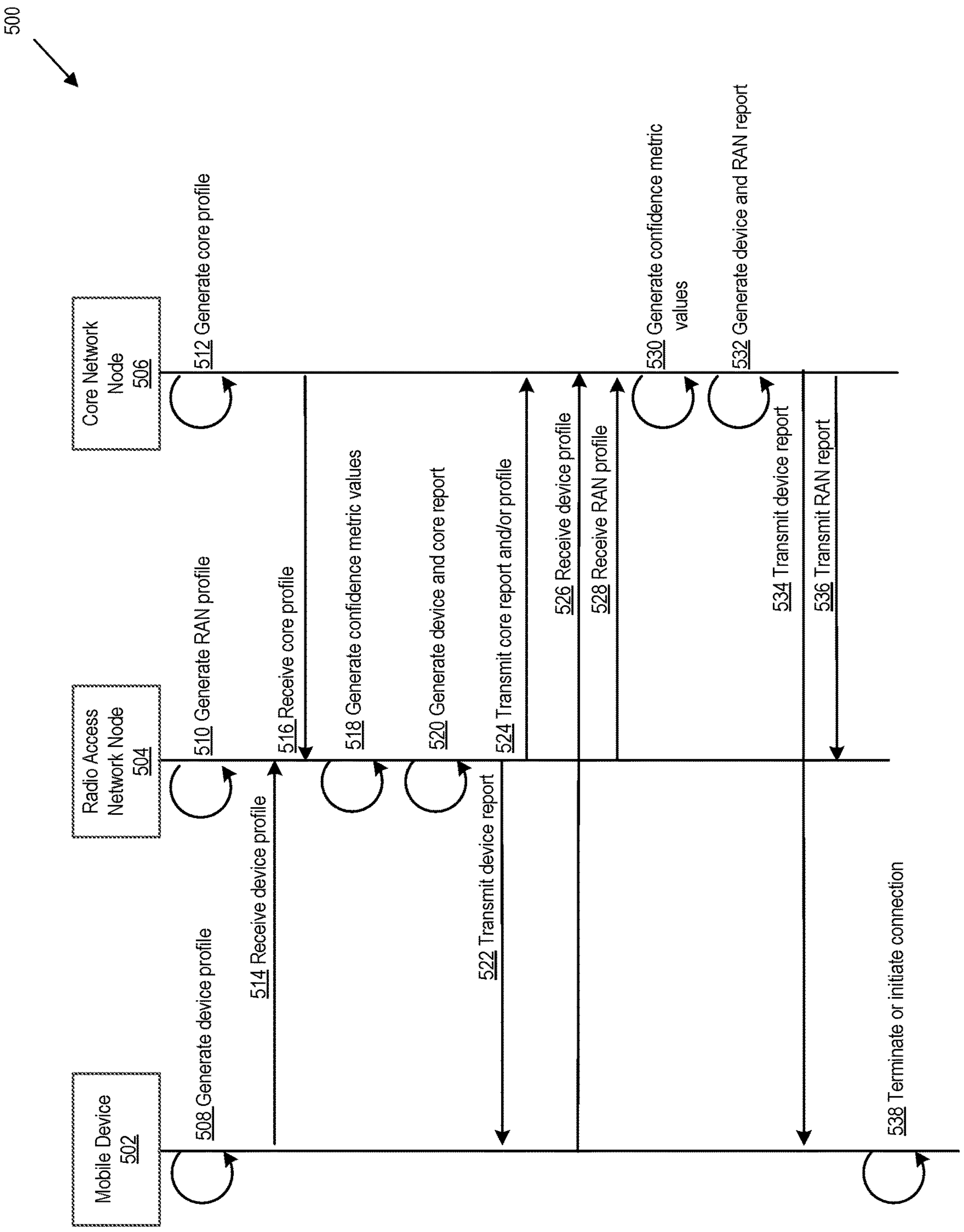
FIG. 5 is a block diagram that illustrates a process for evaluating network performance based on device profile data, core profile data, and radio access network (RAN) profile data, in accordance with aspects of the present technology.

FIG. 5 is a block diagram that illustrates a process 500 for evaluating network performance based on device profile data, core profile data, and radio access network (RAN) profile data, in accordance with aspects of the present technology. For example, the network evaluation system described herein can include communications between a mobile device 502, a RAN node 504 (e.g., a RAN system), and/or a core network node 506 (e.g., a core network system).

At operation 508, the mobile device 502 can generate a device profile associated with device information. For example, the device profile can include information relating to the mobile device and/or associated user, such as location data (e.g., GPS or network-derived location data), a device identifier, or other information associated with the user (e.g., including plane tickets, train tickets, or other information associated with the user's schedule). By generating or compiling such information, the mobile device 502 can share information relevant to making network-related decisions (e.g., associated with initiating or terminating connections with base stations of the telecommunication network).

At operation 510, the RAN node 504 can generate a RAN profile associated with a RAN of a telecommunications network. For example, the RAN profile can include information relating to a given RAN or RAN node, including antenna information, bandwidth information, performance information, telecommunications channel information, or other information associated with a connection between a mobile device and a core network. By generating or compiling such information, the RAN node 504 can share information relevant to making network-related decisions (e.g., associated with initiating or terminating connections between the mobile device and base stations associated with the RAN).

At operation 512, the core network node 506 can generate a core profile associated with a telecommunications network. For example, the core profile can include information associated with the core network, including user subscription data, network capabilities, network performance, or other suitable information. By generating or compiling such information the core network node 506 can share information relevant to making network-related decisions (e.g., associated with initiating or terminating connections between the mobile device, base stations, and associated network components).

At operation 514, the RAN node 504 can receive a device profile from the mobile device 502. For example, the RAN node 504 receives, from a mobile device characterized by a connection to a first base station of the RAN system, a device profile, wherein the device profile comprises a representation of device information generated using a first machine learning model associated with the mobile device. As an illustrative example, the RAN node 504 receives information relating to the previous locations of the mobile device and associated timestamps. In some implementations, the received device profile includes a report generated by a mobile device-related machine learning model, including a location prediction or other similar information. By receiving such information, the RAN node 504 can determine, process, or compile relevant information for further determination or evaluation of network connections, thereby enabling the network evaluation system to improve the efficiency and capabilities of the network.

At operation 516, the RAN node 504 can receive a core profile from the core network node 506. For example, the RAN node 504 receives, from a network node system of a telecommunication network, a core profile, wherein the core profile comprises a representation of core information from a second machine learning model associated with the network node system. As an illustrative example, the RAN node 504 can receive information relating to the core network, such as information relating to available network features, other RAN nodes and/or systems, and user subscription information. By receiving such information, the RAN node 504 can determine, process, or compile relevant information for further initiation or termination of network connections, thereby enabling the network evaluation system to improve network performance.

At operation 518, the RAN node 504 can generate confidence metric values based on the device profile and the core profile. For example, the RAN node 504 determines a first confidence metric value for the device profile based on a device identifier and a second confidence metric value for the core profile based on a node identifier. As an illustrative example, the RAN node 504 can generate confidence metric values associated with the device profile and/or the core profile by determining a consistency or accuracy of such information. The RAN node 504 can determine the noisiness or realism of received location information (including predicted locations) by comparing locations associated with the mobile device with historical user behavior. By doing so, the RAN node 504 can determine to weigh different data to different extents, thereby improving the flexibility and efficiency of network performance evaluation by the network evaluation system.

In some implementations, the RAN node 504 can determine the confidence metric value based on location data. For example, the RAN node 504 determines the device identifier based on the device profile. The RAN node 504 extracts, from the device profile, location data indicating a set of previous geographical coordinates associated with the mobile device. The RAN node 504 generates a predicted location based on the location data, wherein the predicted location includes a set of predicted geographical coordinates associated with the mobile device. The RAN node 504 generates the first confidence metric value based on the predicted location. For example, the RAN node 504 can determine whether the predicted location is indeed consistent with the previous location data and/or data associated with the user of the mobile device (e.g., a home address or other identifiable information relating to the user). By doing so, the RAN node 504 can evaluate whether information within the device profile is accurate, thereby improving the accuracy of network performance evaluation.

At operation 520, the RAN node 504 can provide the device and core profiles, and associated confidence metric values, to a machine learning model to generate device and core reports. For example, the RAN node 504 provides the device profile, the core profile, the first confidence metric value, and the second confidence metric value to a third machine learning model to generate a device report and a core report. As an illustrative example, the RAN node 504 can generate information to transmit to the device and the core network based on compiled information from either sources. For example, the RAN node 504 can curate (e.g., filter or process) data from the device or core profiles, as well as supplement such data with local information relating to the RAN system, thereby improving the relevance of information provided to other network components. By doing so, the network evaluation system enables improved accuracy and efficiency with respect to network connection decisions (e.g., the determination to initiate or terminate network connections between network components).

In some implementations, the RAN node 504 can update the machine learning model based on local data associated with the RAN system. For example, the RAN node 504 retrieves a RAN profile associated with the RAN system, wherein the RAN profile includes information relating to performance of the RAN system. The RAN node 504 can provide the RAN profile to the third machine learning model to update, based on the RAN profile, the device report and the core report. As an illustrative example, the RAN node 504 can supplement information received from the core and the device with information particular to the RAN (e.g., including network capabilities, capacity, uplink/downlink information, or other performance-related information) in order to improve the reports sent to the core and device. By doing so, the RAN node 504 improves the relevance of data considered by network components in determining to initiate or terminate network connections, thereby improving network-wide performance.

In some implementations, the RAN node 504 can generate the device report to include information based on base stations or RAN nodes associated with a predicted location. For example, the RAN node 504 identifies, based on the core profile, information relating to a set of RAN nodes associated with a geographical region of the predicted location. The RAN node 504 can generate the device report to include the information relating to the set of RAN nodes. As an illustrative example, the RAN node 504 can include information relating to base stations or other network nodes in a region associated with a predicted location of the mobile device. By doing so, the RAN node 504 provides information to the mobile device relating to possible base stations that may be convenient or have improved performance based on the device's likely future location, thereby improving device performance on the network.

In some implementations, the RAN node 504 can generate the core report to include telecommunications channel condition data. For example, the RAN node 504 determines, based on the device profile, the core profile, the first confidence metric value, and the second confidence metric value, telecommunications channel condition data. The RAN node 504 can generate the core report to include the telecommunications channel condition data. As an illustrative example, the RAN node 504 can include information relating to network performance (e.g., at a particular base station, across a cell, or across an RAN) for transmission to a core network node. Such information enables the core network to obtain information relevant to network performance, thereby enabling the core network to evaluate network performance across multiple RANs or associated network components.

In some implementations, the RAN node 504 generates the core report to include spectral efficiency information. For example, the RAN node 504 determines, based on the device profile, the core profile, the first confidence metric value, and the second confidence metric value, spectral efficiency information relating to the RAN system. The RAN node 504 can generate the core report to include the spectral efficiency information. As an illustrative example, the RAN node 504 can generate the core report to include information relating to an amount of data transmitted over a given spectrum or bandwidth with minimum transmission errors (e.g., a number of bits transmitted to a specified number of users per second while maintaining an acceptable QoS). By transmitting such information to the core network in the core report, the RAN node 504 enables the core network to receive information relating to network performance at constituent RANs, thereby providing holistic information to the core network relating to network-wide performance.

In some implementations, the RAN node 504 can generate the device report and the core report based on weight s that are associated with the confidence metric values. For example, the RAN node 504 generates a first weight based on the first confidence metric value and a second weight based on the second confidence metric value, wherein the first weight indicates a relative significance of the device profile and wherein the second weight indicates a relative significance of the core profile. The RAN node 504 can provide the first weight and the second weight to the third machine learning model to generate the device report and the core report. As an illustrative example, the RAN node 504 can, using the machine learning model, weigh inputs according to the respective confidence metric values. By doing so, the RAN node 504 improves the accuracy and reliability of network performance evaluation and associated information, thereby improving the efficiency and success with which the network can improve network performance.

At operation 522, the RAN node 504 can transmit the device report to the mobile device 502. At operation 524, the RAN node 504 can transmit the core report to the core network node 506 (e.g., the network node system). By transmitting information to respective network components, the RAN node 504 can flexibly and specifically transmit information relevant to respective network components to inform network connection decisions. For example, the network evaluation system enables network components to receive information relevant to their operations, while omitting irrelevant, extraneous information, thereby improving the efficiency of the network evaluation system while preventing unnecessary information transmission.

At operation 538, the RAN node 504 can cause the mobile device 502 to terminate or initiate a connection to a base station. For example, in response to transmitting the device report to the mobile device and the core report to the network node system, the RAN node 504 causes the mobile device to terminate the connection to the first base station and initiate a connection to a second base station of the RAN system. As an illustrative example, based on information associated with the RAN and the core, as well as information provided to the RAN from the mobile device, the mobile device can determine an improved selection of a base station (e.g., based on a future predicted location of the mobile device). As such, the systems and methods disclosed herein enable improved network connection decisions based on holistic information relating to network performance at the core network level, the mobile device level, and the RAN level.

In some implementations, the RAN node 504 can determine an upper-level cell associated with the telecommunication network for device registration of the mobile device. For example, the RAN node 504 determines, based on the predicted location and the core profile, an upper-level cell associated with the telecommunication network. The RAN node 504 identifies, based on the core profile, the second base station associated with the upper-level cell. The RAN node 504 can generate the device report to include an identifier of the second base station. As an illustrative example, the RAN node 504 can generate the device report to include a suggested base station with expected performance improvements with respect to an existing base station connected to the mobile device. As such, the network evaluation system enables the mobile device to modify its registration with the associated telecommunication network, thereby improving network performance.

In some implementations, the RAN node 504 can determine to initiate a connection with a base station consistent with a user subscription indicator. For example, the RAN node 504 determines the device identifier based on the device profile. The RAN node 504 can identify, based on the core profile, a user subscription indicator for the device identifier. In response to identifying the user subscription indicator, the RAN node 504 can cause the mobile device to initiate the connection to the second base station, wherein the second base station is consistent with the user subscription indicator. As an illustrative example, the RAN node 504 can cause the mobile device to initiate a connection with a base station according to allowed QoS or other user subscription data, thereby ensuring that the mobile device's registration with the telecommunication network is consistent with any subscription-based rules or criteria (e.g., relating to network technology or bandwidth).

At operation 526, the core network node 506 can receive a device profile from the mobile device 502. For example, the core network node 506 receives, from a mobile device characterized by a connection to a first base station of a radio access network (RAN) system of a telecommunication network, a device profile, wherein the device profile comprises a representation of device information generated using a first machine learning device associated with the mobile device.

At operation 528, the core network node 506 can receive a RAN profile from the RAN node 504. For example, the core network node 506 receives, from the RAN system, a RAN profile, wherein the RAN profile comprises a representation of RAN information from a second machine learning model associated with the RAN system.

At operation 530, the core network node 506 can generate confidence metric values based on the RAN profile and the device profile. For example, the core network node 506 determines a first confidence metric value for the device profile based on a device identifier and a second confidence metric value for the RAN profile based on a RAN identifier.

In some implementations, the core network node 506 can determine the confidence metric based on a predicted location and/or location data associated with the mobile device. For example, the core network node 506 determines the device identifier based on the device profile. The core network node 506 can extract, from the device profile, location data indicating a set of previous geographical coordinates associated with the mobile device. The core network node 506 can generate a predicted location based on the location data, wherein the predicted location includes a set of predicted geographical coordinates associated with the mobile device. The core network node 506 can generate the first confidence metric value based on the predicted location.

At operation 532, the core network node 506 can provide the device profile, the RAN profile, and the confidence metric values to a machine learning model to generate device and RAN reports. For example, the core network node 506 provides the device profile, the RAN profile, the first confidence metric value, and the second confidence metric value to a third machine learning model to generate a device report and a RAN report.

In some implementations, the core network node 506 can update the device report and the RAN report based on performance information associated with the core profile. For example, the core network node 506 retrieves a core profile associated with the network node system, wherein the core profile includes information relating to performance of the telecommunications system. The core network node 506 provides the core profile to the third machine learning model to update, based on the core profile, the device report and the RAN report.

In some implementations, the core network node 506 can retrieve base station information according to a predicted location for the mobile device. For example, the core network node 506 retrieves, from a RAN database, information relating to a set of base stations associated with a geographical region of the predicted location. The core network node 506 can generate the device report to include the information relating to the set of base stations.

In some implementations, the core network node 506 can generate the RAN report to include telecommunications channel condition data. For example, the core network node 506 determines, based on the device profile, the RAN profile, the first confidence metric value, and the second confidence metric value, telecommunications channel condition data. The core network node 506 can generate the RAN report to include the telecommunications channel condition data.

In some implementations, the core network node 506 can generate the RAN report to include spectral efficiency data. For example, the core network node 506 determines, based on the device profile, the RAN profile, the first confidence metric value, and the second confidence metric value, spectral efficiency information relating to the RAN system. The core network node 506 can generate the RAN report to include the spectral efficiency information.

In some implementations, the core network node 506 can generate the device report and the RAN report according to weights associated with the confidence metric values. For example, the core network node 506 generates a first weight based on the first confidence metric value and a second weight based on the second confidence metric value, wherein the first weight indicates a relative significance of the device profile, and wherein the second weight indicates a relative significance of the RAN profile. The core network node 506 provides the first weight and the second weight to the third machine learning model to generate the device report and the RAN report.

At operation 534, the core network node 506 can transmit the device report to the mobile device 502. At operation 536, the core network node 506 can transmit the RAN report to the RAN node 504.

At operation 538, the core network node 506 can cause the mobile device 502 to terminate or initiate a connection with a base station. For example, in response to transmitting the device report to the mobile device and the RAN report to the RAN system, the core network node 506 causes the mobile device to terminate the connection to the first base station and initiate a connection to a second base station of the RAN system.

In some implementations, the core network node 506 generates the device report to include an identifier of the second base station. For example, core network node 506 determines, based on the predicted location and the RAN profile, an upper-level cell associated with the telecommunication network. The core network node 506 can identify, based on the RAN profile, the second base station associated with the upper-level cell. The core network node 506 can generate the device report to include an identifier of the second base station.

Computer System

Figure 6:
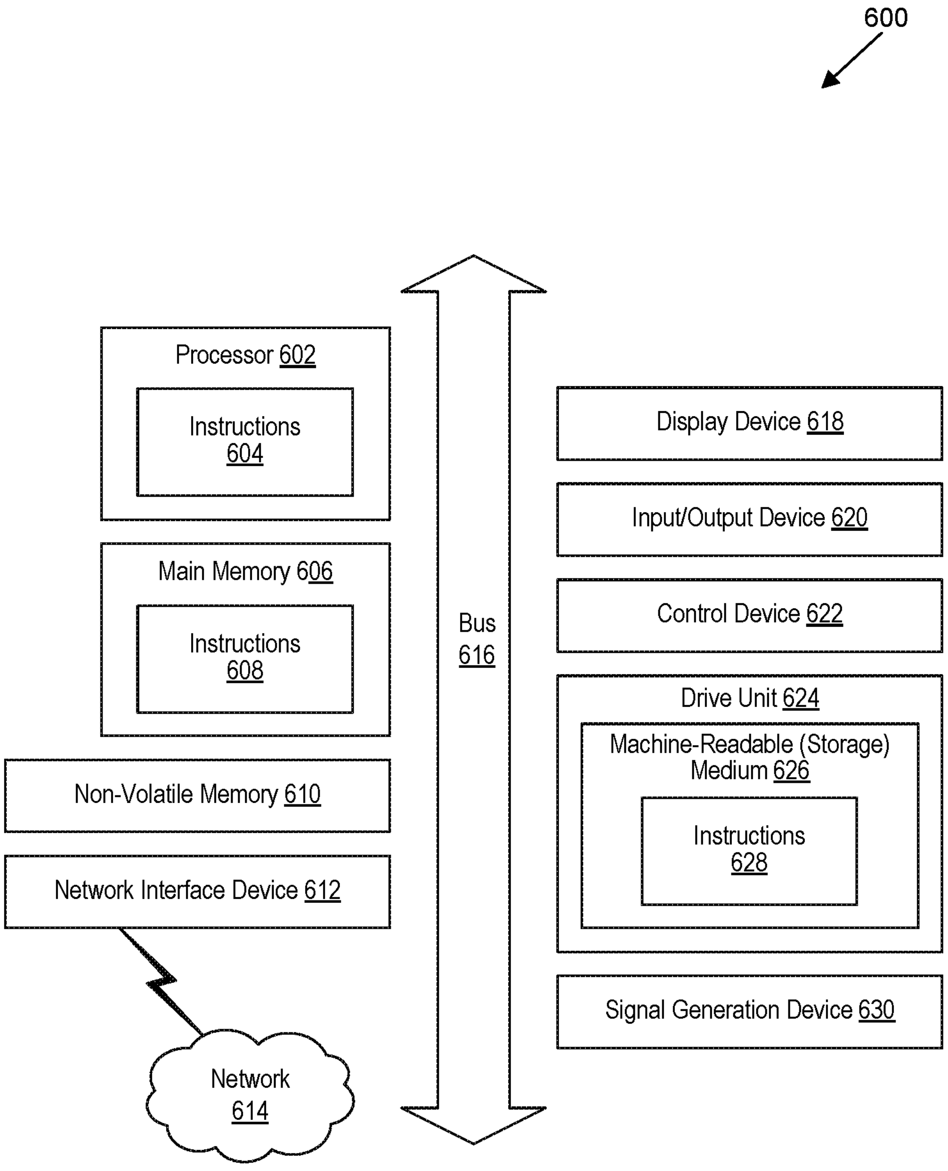
FIG. 6 is a block diagram that illustrates components of a computing device.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, a video display device 618, an input/output device 620, a control device 622 (e.g., keyboard and pointing device), a drive unit 624 that includes a machine-readable (storage) medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementations, the computer system 600 can be an embedded computer system, a system-on-chip (SOC), a single-board computer system (SBC), or a distributed system such as a mesh of computer systems, or it can include one or more cloud components in one or more networks. Where appropriate, one or more computer systems 600 can perform operations in real time, in near real time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A radio access network (RAN) system comprising:

at least one hardware processor; and at least one non-transitory memory storing instructions, which, when executed by the at least one hardware processor, cause the RAN system to:

receive, from a mobile device characterized by a connection to a first base station of the RAN system, a device profile, wherein the device profile comprises a representation of device information generated using a first machine learning model associated with the mobile device;

receive, from a network node system of a telecommunication network, a core profile, wherein the core profile comprises a representation of core information from a second machine learning model associated with the network node system;

determine a first confidence metric value for the device profile using (1) a device identifier and (2) a second confidence metric value for the core profile of a node identifier for the network node system;

provide the device profile, the core profile, the first confidence metric value, and the second confidence metric value to a third machine learning model to generate a device report and a core report; and transmit the generated device report to the mobile device;

transmit the generated core report to the network node system; and in response to transmitting the device report to the mobile device and the core report to the network node system, cause the mobile device to terminate the connection to the first base station and initiate a connection to a second base station of the RAN system.

2. The RAN system of claim 1, wherein the instructions for generating the device report and the core report cause the RAN system to:

retrieve a RAN profile associated with the RAN system, wherein the RAN profile includes information relating to performance of the RAN system; and provide the RAN profile to the third machine learning model to update, based on the RAN profile, the device report and the core report.

3. The RAN system of claim 1, wherein the instructions for determining the first confidence metric value cause the RAN system to:

determine the device identifier based on the device profile;

extract, from the device profile, location data indicating a set of previous geographical coordinates associated with the mobile device;

generate a predicted location based on the location data, wherein the predicted location includes a set of predicted geographical coordinates associated with the mobile device; and generate the first confidence metric value based on the predicted location.

4. The RAN system of claim 3, wherein the instructions for generating the device report cause the RAN system to:

identify, based on the core profile, information relating to a set of RAN nodes associated with a geographical region of the predicted location; and generate the device report to include the information relating to the set of RAN nodes.

5. The RAN system of claim 3, wherein the instructions for causing the mobile device to initiate the connection to the second base station cause the RAN system to:

determine, based on the predicted location and the core profile, an upper-level cell associated with the telecommunication network;

identify, based on the core profile, the second base station associated with the upper-level cell; and generate the device report to include an identifier of the second base station.

6. The RAN system of claim 1, wherein the instructions for causing the mobile device to initiate the connection to the second base station cause the RAN system to:

determine the device identifier based on the device profile;

identify, based on the core profile, a user subscription indicator for the device identifier; and in response to identifying the user subscription indicator, cause the mobile device to initiate the connection to the second base station, wherein the second base station is consistent with the user subscription indicator.

7. The RAN system of claim 1, wherein the instructions for generating the core report cause the RAN system to:

determine, based on the device profile, the core profile, the first confidence metric value, and the second confidence metric value, telecommunications channel condition data; and generate the core report to include the telecommunications channel condition data.

8. The RAN system of claim 1, wherein the instructions for generating the core report cause the RAN system to:

determine, based on the device profile, the core profile, the first confidence metric value, and the second confidence metric value, spectral efficiency information relating to the RAN system; and generate the core report to include the spectral efficiency information.

9. The RAN system of claim 1, wherein the instructions for generating the core report and the device report cause the RAN system to:

generate a first weight based on the first confidence metric value and a second weight based on the second confidence metric value, wherein the first weight indicates a significance of the device profile, and wherein the second weight indicates a significance of the core profile; and provide the first weight and the second weight to the third machine learning model to generate the device report and the core report.

10. A network node system comprising:

at least one hardware processor; and at least one non-transitory memory storing instructions, which, when executed by the at least one hardware processor, cause the network node system to:

receive, from a mobile device characterized by a connection to a first base station of a radio access network (RAN) system of a telecommunication network, a device profile, wherein the device profile comprises a representation of device information generated using a first machine learning model associated with the mobile device;

receive, from the RAN system, a RAN profile, wherein the RAN profile comprises a representation of RAN information from a second machine learning model associated with the RAN system;

determine a first confidence metric value for the device profile based on (1) a device identifier and (2) a second confidence metric value for the RAN profile of a RAN identifier for the RAN system;

provide the device profile, the RAN profile, the first confidence metric value, and the second confidence metric value to a third machine learning model to generate a device report and a RAN report;

transmit the generated device report to the mobile device;

transmit the generated RAN report to the RAN system; and in response to transmitting the device report to the mobile device and the RAN report to the RAN system, cause the mobile device to terminate the connection to the first base station and initiate a connection to a second base station of the RAN system.

11. The network node system of claim 10, wherein the instructions for generating the device report and the RAN report cause the network node system to:

retrieve a core profile associated with the network node system, wherein the core profile includes information relating to performance of the telecommunications system; and provide the core profile to the third machine learning model to update, based on the core profile, the device report and the RAN report.

12. The network node system of claim 10, wherein the instructions for determining the first confidence metric value cause the network node system to:

determine the device identifier based on the device profile;

extract, from the device profile, location data indicating a set of previous geographical coordinates associated with the mobile device;

generate a predicted location based on the location data, wherein the predicted location includes a set of predicted geographical coordinates associated with the mobile device; and generate the first confidence metric value based on the predicted location.

13. The network node system of claim 12, wherein the instructions for generating the device report cause the network node system to:

retrieve, from a RAN database, information relating to a set of base stations associated with a geographical region of the predicted location; and generate the device report to include the information relating to the set of base stations.

14. The network node system of claim 12, wherein the instructions for causing the mobile device to initiate the connection to the second base station cause the network node system to:

determine, based on the predicted location and the RAN profile, an upper-level cell associated with the telecommunication network;

identify, based on the RAN profile, the second base station associated with the upper-level cell; and generate the device report to include an identifier of the second base station.

15. The network node system of claim 10, wherein the instructions for generating the RAN report cause the network node system to:

determine, based on the device profile, the RAN profile, the first confidence metric value, and the second confidence metric value, telecommunications channel condition data; and generate the RAN report to include the telecommunications channel condition data.

16. The network node system of claim 10, wherein the instructions for generating the RAN report cause the network node system to:

determine, based on the device profile, the RAN profile, the first confidence metric value, and the second confidence metric value, spectral efficiency information relating to the RAN system; and generate the RAN report to include the spectral efficiency information.

17. The network node system of claim 10, wherein the instructions for generating the RAN report and the device report cause the network node system to:

generate a first weight based on the first confidence metric value and a second weight based on the second confidence metric value, wherein the first weight indicates a significance of the device profile, and wherein the second weight indicates a significance of the RAN profile; and provide the first weight and the second weight to the third machine learning model to generate the device report and the RAN report.

18. A method comprising:

receiving, from a mobile device characterized by a connection to a first base station of a radio access network (RAN) system of a telecommunication network, a device profile, wherein the device profile comprises a representation of device information generated using a first machine learning model associated with the mobile device;

receiving, from the RAN system, a RAN profile, wherein the RAN profile comprises a representation of RAN information from a second machine learning model associated with the RAN system;

determining a first confidence metric value for the device profile based on (1) a device identifier and (2) a second confidence metric value for the RAN profile of a RAN identifier for the RAN system;

providing the device profile, the RAN profile, the first confidence metric value, and the second confidence metric value to a third machine learning model to generate a device report and a RAN report;

transmitting the generated device report to the mobile device;

transmitting the generated RAN report to the RAN system; and in response to transmitting the device report to the mobile device and the RAN report to the RAN system, causing the mobile device to terminate the connection to the first base station and initiate a connection to a second base station of the RAN system.

19. The method of claim 18, wherein generating the device report and the RAN report comprises:

retrieving a core profile associated with a network node system of the telecommunication network, wherein the core profile includes information relating to performance of the telecommunication network; and providing the core profile to the third machine learning model to update, based on the core profile, the device report and the core report.

20. The method of claim 18, wherein determining the first confidence metric value comprises:

determining the device identifier based on the device profile;

extracting, from the device profile, location data indicating a set of previous geographical coordinates associated with the mobile device;

generating a predicted location based on the location data, wherein the predicted location includes a set of predicted geographical coordinates associated with the mobile device; and generating the first confidence metric value based on the predicted location.

* * * * *